April 8, 1952 J. A. PARTHÉMORE 2,592,181
SECTIONAL INNER TUBE
Filed Feb. 6, 1947
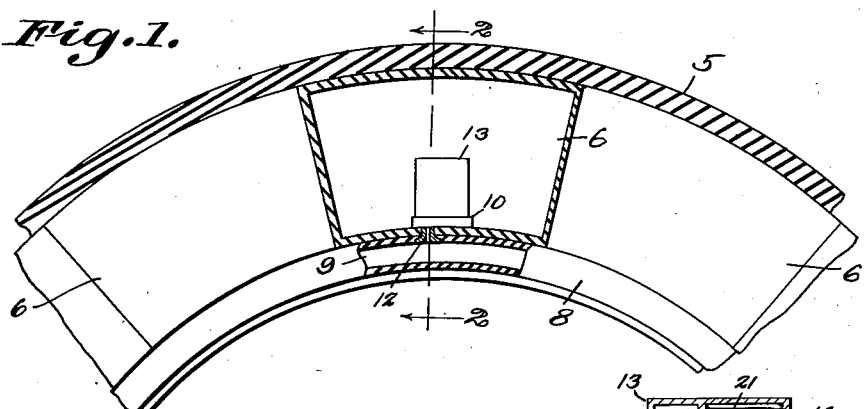
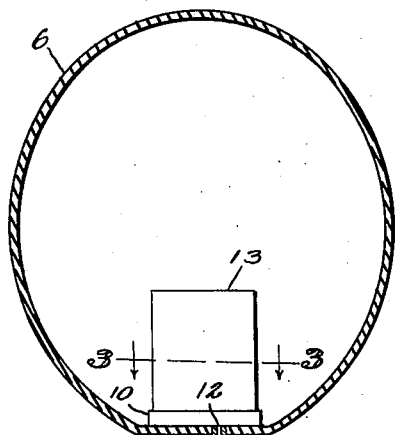
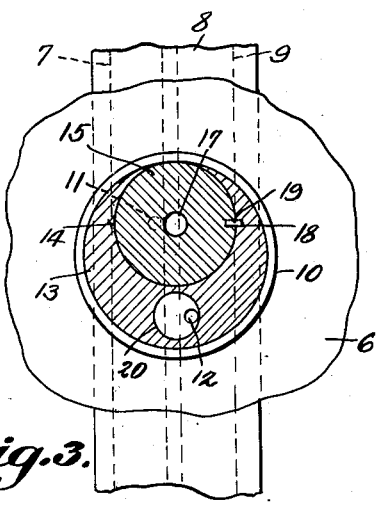
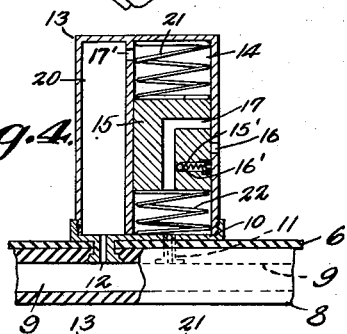
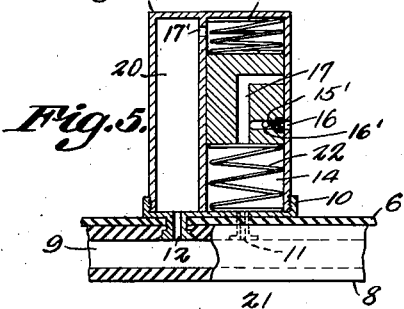
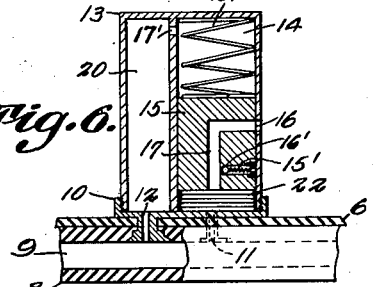
Inventor
J. A. Parthemore
By C. A. Snow & Co.
Attorneys.

Patented Apr. 8, 1952

2,592,181

UNITED STATES PATENT OFFICE 2,592,181

SECTIONAL INNER TUBE

Jacob A. Parthemore, Saltsburg, Pa.

Application February 6, 1947, Serial No. 726,928

1 Claim. (Cl. 152—337)

This invention relates to pneumatic tires, the primary object of the invention being to provide a pneumatic tire embodying an inner tube made up of a plurality of independent pneumatic chambers, fed from a tube common to all of the chambers.

An important object of the invention is to provide a valve which will automatically control the passage of air to and from the individual chambers, to the end that the chambers may be readily deflated, should it become necessary to remove the inner tube for the purpose of repair.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a fragmental sectional view through a tire casing equipped with a sectional inner tube constructed in accordance with the invention, one of the chambers of the tube being shown in section.

Figure 2 is a sectional view taken on line 2—2 of Figure 1.

Figure 3 is a sectional view taken on line 3—3 of Figure 2.

Figure 4 is a sectional view through one of the valve members, showing the slide valve as in its normal position to retain the air pressure within the chamber of the inner tube, in which the valve is positioned.

Figure 5 is a vertical sectional view through the valve, illustrating the position of the slide valve when the tube is being inflated.

Figure 6 is a vertical sectional view through the valve, illustrating the position of the slide valve, when the inner tube is being deflated.

Referring to the drawing in detail, the reference character 5 designates a tire casing, and the reference character 6 designates the independent air chambers of the inner tube. These air chambers 6, are in communication with the inlet passageway 7 of the tube 8 that is vulcanized to the various air chambers. The tube 8 is also provided with an outlet passageway 9 that is in communication with the air chambers, so that air may pass from the air chambers, when it is desired to deflate the chambers and remove the inner tube.

The passageways 7 and 9 are supplied with the usual conventional tire valves used with inner tubes.

Each of the chambers 6 is provided with a valve, through which communication between the chambers and passageways of the tube 8, is provided. Each of these valves includes a circular base indicated at 10 from which the pipe 11 and pipe 12 extend, the inlet pipe extending into the passageway 7, while the outlet pipe 12 extends into the passageway 9. In view of the fact that all of these valves are of the same construction, only one valve will be described in detail. The body portion of the valve is indicated at 13, and has its lower end threaded and positioned within the circular base 10, as clearly shown by the drawing. The body portion is bored to provide a cylinder 14 in which the valve piston 15 operates, the cylinder being provided with an opening 17' in the wall thereof, for purposes to be hereinafter more fully described.

The valve piston 15 is formed with a bore 17 extending into the center thereof, the bore 17 extending laterally at right angles, to register with the opening 16 as shown by Figure 5 of the drawing, so that air may pass upwardly through the valve and exhaust into the chamber, of which the valve forms a part, through the opening and bore 17.

The valve piston 15 is also formed with a bore 15' which provides a housing for the spring pressed one way valve 16', which valve is adapted to unseat by pressure from within the bore 17 to release air into the air chamber 6 filling the chamber when the valve piston 15 moves to a position so that bore 15' falls opposite to the opening 16 at the outer side of the valve. This check valve 16' will act to seat and prevent the escape of air should the piston be thrown outwardly by centrifugal force to such a degree as to cause the bore 15' to register with the opening 16 when the tire is rotating at a rapid rate of speed. Since piston 15 may compress the outer spring 21 the bore 15' will remain shut to prevent the escape of air through the opening 16. In order that the piston 15 will be maintained in its proper position within the cylinder, so that the bore 17 thereof will register with the opening 16, a groove 18 is formed within the cylinder adjacent to the bore or cylinder 14, for the reception of the pin 19 that extends from the valve piston 15, preventing rotary movement of the piston within the cylinder.

The body portion 13 is also bored to provide a compartment 20 which is in communication with the cylinder 14, adjacent to the outer end thereof through the inner opening 17'.

Mounted at the outer end of the cylinder 14, is a coiled spring 21 that bears against the piston 15, normally urging the piston 15 towards the base 10 thereof. Mounted at the opposite end of the piston 15, and resting on the base 10, is a coiled spring 22, the coiled spring 21 being of a tension to normally overcome the action of the coiled spring 22, with the result that the normal position of the piston 15, when the tire is inflated to running pressure, will be as shown by Figure 4 of the drawing wherein the aligning openings 16 of the valve cylinder, are closed by the upper end of the piston 15. When air is being directed to the inner tube through the pipe 11, to inflate the various chambers, the air within the passageway 7, enters the lower end of chamber 14 and passes into bore 17, the air pressure forcing piston 15 outwardly until the check valve 16' registers with the opening 16. Check valve 16' now is under air pressure and the chamber is filled with air through said valve. When the air chamber 6 becomes filled with air, the valve will be closed by air pressure within the chamber.

When all of the chambers of the inner tube have become inflated, the hose through which air under pressure is being forced into the inner tube, will be disconnected from the tube in the usual and well known manner. The action of the spring 21 will move the piston downwardly against the action of the spring 22 and air pressure within the tube 7, whereupon the piston 15 will take the position as shown in Figure 4 of the drawing, and the air chamber will remain inflated.

Should it be desired to remove the inner tube for purposes of repair, it is of course necessary to deflate the various chambers. To accomplish this, air under pressure is directed to the passageway 9, the air entering the compartments 20 through the openings 12, from where the air passes into the cylinders 14, through the openings 17. The air entering the cylinders 14 will operate to force the pistons 15 downwardly or inwardly, and air under pressure is locked in the upper end of the cylinders 14 as shown by Fig. 6. Air rushes from the air chambers 6, through the openings 16 and bores 17. It will of course be understood that the valve on the passageway 7 will be held open by a suitable instrument, so that the air may pass from the various chambers and exhaust, deflating the tire to remove the inner tube.

It is obvious that when air pressure through the openings 16, compartments 20, pipes 12 and passageways 9 is relieved, the pistons will return to the positions shown by Fig. 4 of the drawings to permit the inflation of the inner tube.

Thus it will be seen that due to the construction shown and described, all of the chambers of the inner tube may be automatically deflated, by merely releasing the air in the passageway 7 of the tube 8, leaving the various chambers of the inner tube deflated so that the inner tube may be readily removed.

What is claimed is:

An inner tube comprising a plurality of independent inflatable air chambers, a valve including a body portion in each chamber, the body portion being divided into a valve cylinder and an air compartment, said valve cylinder having an opening establishing communication between the air compartment and valve cylinder, said valve cylinder having an opening establishing communication between the valve cylinder and air chamber in which the body portion is positioned; a floating piston operating in the valve cylinder, said piston having a central bore extending inwardly from the bottom thereof, and extending laterally through the side thereof, said piston having a valve bore adapted to communicate with the central bore and second-mentioned opening, whereby air enters the chamber, said body portion having a central opening in the bottom thereof through which air enters the cylinder inflating the chamber and exhausting from the cylinder deflating the air chamber, springs mounted within the valve cylinder between the ends thereof and said piston, controlling the normal position of the piston when the chamber is inflated, a tube to which said body is connected and with which the body communicates, said tube having a passageway through which air enters and exhausts from the air chamber through the valve cylinder, and said tube having a passageway communicating with the air compartment of the body portion of the valve through which air under pressure is directed to one end of the piston, moving the piston to a position exhausting air from the air chamber.

JACOB A. PARTHEMORE.

REFERENCES CITED

The following references are of record in the file of this patent:

UNITED STATES PATENTS

| Number | Name | Date |
| --- | --- | --- |
| 2,253,230 | Feldman | Aug. 19, 1941 |